April 27, 1965 J. VILLIERS 3,181,142
AIR RADIO NAVIGATION CONTROL SYSTEMS
Filed July 26, 1960 7 Sheets-Sheet 1

FIG.1.

Inventor
J. Villiers
By Matthew Russo
Attorney

April 27, 1965 J. VILLIERS 3,181,142
AIR RADIO NAVIGATION CONTROL SYSTEMS
Filed July 26, 1960 7 Sheets-Sheet 2

FIG. 2.

Inventor
J. Villiers
By [signature]
Attorney

United States Patent Office 3,181,142
Patented Apr. 27, 1965

3,181,142
AIR RADIO NAVIGATION CONTROL SYSTEMS
Jacques Villiers, Paris, France, assignor to International Standard Electric Corporation, New York, N.Y., a corporation of Delaware
Filed July 26, 1960, Ser. No. 45,383
Claims priority, application France, July 31, 1959, 801,703
12 Claims. (Cl. 343—6)

The present invention relates to air radio navigation control systems, and more particularly to a system called "Datarama" providing to a ground station, on the one hand, the position of the crafts moving in a determined space and, on the other hand, the selective setting up of interlinks with each one of the said mobile crafts.

Radio navigation systems are known which provide means for aircrafts to have their position determined in the space. Radar systems provide means for a ground station to know the positions of crafts moving in a determined space. Moreover there are methods for coding and transmitting information, the scope of which is to selectively set up communications between a ground station and a certain number of mobile crafts by providing a time dividing multiplex system, each channel of the multiplex system being denominated by the call signal of the mobile craft used as a coded address.

One of the objects of this invention is to provide a system on the basis of usual radio navigation systems and, on the one hand, at a ground station means for determining the position of the crafts moving in a given space, such as radar systems and, on the other hand, means for setting up selectively communications between a ground station and a certain number of mobile crafts indicated, not by their call signal, as in known systems, but by their position in the controlled space of the said ground station.

The arrangement of this system is as follows:
(a) By means of signals proceeding from selected radio navigation means, the craft determines its position;
(b) Elementary devices prepare in the craft a response signal, the time position of which is characteristic of the position of the craft which is transmitting this signal;
(c) The transmission of this signal, after a short delay, assigns to the craft which transmitted the said signal, a time period sufficient to provide air-ground coded information exchange, then ground-air exchange (call signal of the aircraft, altitude, etc.). The selective communication channels thus set up are successively allotted to the crafts depending upon their position;
(d) The allotment of a coded transmitting channel to an aircraft is automatic, without any preliminary information exchange, as soon as the aircraft starts operating its device; the ground station may at any time stop the automatic sweeping-scanning of the space and point out any zone for an immediate setting up of a coded communication with an aircraft located in the said zone;
(e) The characteristic signals of the aircrafts and also their coded messages can be carried without any transformation over a telephone line due to the small pass band needed. The decoding may thus be effected remotely in a control center independent of the radio navigation system; a panoramic display of the aircrafts may be realised by conventional means.

A cathode display may likewise be merely obtained on board of the aircrafts. These displays may be selected depending upon the altitude of the aircrafts mentioned in the coded message accompanying response pulses; this display may be used as "airway tracer" and detector of collision dangers.

Likewise the collision dangers may be automatically detected at the ground station by the analysis of the information contained in the coded responses.

The present invention may be applied to any radio navigation system utilizing directly or indirectly at least one moving position line. In order to simplify the specification, the invention will be described as being applied to the VORTAC system which is the standard system of the O.I.C.A. (Organization of the International Civil Aviation).

A VORTAC ground station comprises:
(a) A VOR radio beacon (very high frequency omnirange) transmitting on the 112–119 mc. frequency band two 30 c.p.s. signals, the angular displacement of any point M of the space with respect to the beacon being constructionally equal to the azimuth $\theta$ of point M. It is known to derive from this system a moving position line constituted by a radius vector (or more precisely an angular aperture sector $d\theta$) coming from the radio beacon and rotating at the rate of 30 rotations per second;
(b) A responder so-called DME/T (distance measuring equipment utilized wtih the standard military Tacan system). An interrogating device located on board of an aircraft transmits interrogation pulses on a carrier wave in the 1,000 mc. frequency band. The said pulses are repeated by the DME/T on another frequency of the same frequency band. The comparison of the interrogation signal and response signal permits to the aircraft to recognize the response to its interrogations (due to the random characteristic of the interrogation time) and to determine therefrom its distance $\rho$ from DME/T.

The polar coordinates $\rho, \theta$ with respect to the beacon of the VORTAC systems are thus determinable by the aircraft. The VORTAC system is normally usable by a number of aircrafts which does not exceed 120. The relatively weak power of the interrogating device on board and that of the responder on ground permits the radiation of numerous supplementary pulses without being a drawback for the correct distance measurement operation.

According to a feature of the present invention, a complete sweeping-scanning of the space will be realized. When the radius vector passes through the north of the VORTAC station, the DME/T transmits coded pulses $S_p$ which are characteristic of a number $p$. The number $p$ is a reference number intended to be arranged in series magnitude denominated either by its row or by a signal which precedes it. For instance, it may be agreed that, according as the number $p$ is lower or higher than a determined limit, it must be compared with a distance $\rho$ or an altitude $h$ expressed in conventional units. It is also possible to have the number $p$ preceded with a signal indicating the value $\rho$ or $h$ to be compared with it and to have the number $p$ followed with a signal giving the error limit $\Delta p$ on number $p$.

The receiver of the distance meter on board decodes the number $p$ and according to the selected processing compares this number $p$ (with the error limit $\Delta p$) with its distance $\rho$ (or with its altitude $h$) expressed in the same units as number $p$. If the distance (or the altitude) of the aircraft is comprised between $p$ and $p+\Delta p$, the aircraft transmits a characteristic signal at the moment where the rotating angular sector $d\theta$ generated by the VOR passes through it.

According to the present invention, any other modification of the rotating radio beacon is not necessary, except as follows:

The north passage of a characteristic point P of the rotating cardioid pattern generated by the beacon, initiates the transmission through the responder of the DME/T of a signal $S_p$ which is easily identified by the mobile crafts and bearing the number $p$ coded, allotted to the following rotation of the cardioid pattern with available indication of the selected processing and the error limit $\Delta p$.

The VOR receiver located in the mobile craft and which normally comprises means for separately collecting the reference signal and the measuring signal and for comparing the respective phases thereof in order to determine the azimuth $\theta$ of the craft with respect to the ground station, further comprises, according to the invention, means for generating from the measuring signal at the frequency $f$, pulses $i$ of duration $\tau$ and of recurrence frequency $f$ having a phase relationship well determined with the measuring signal. The interrogator-responder DME on board which usually comprises means for radiating at a frequency $F_1$ pulses constituting a signal $I_1$ s able to intiate, by means of the DME/T ground station, the transmission of response pulses constituting a signal $I_2$ at a frequency $F_2$, and also means for receiving these response pulses and for determining therefrom the distance $\rho$ from the mobile craft to the station, further comprises, according to the invention, means for detecting the signal $S_p$ and comparing the number $p$ to a value supplied by a board equipment or instrument provided on the craft, for instance, with the distance $\rho$ measured above or the indication $h$ of the altimeter, means for generating a pulse $i_2$ of the duration $\tau_2$ when there is a relationship provided between the number and the compared value and a coincidence gate giving a pulse $i_3$ of duration $\tau_3$ when it receives simultaneously a pulse $i$ and a pulse $i_2$. The pulse $i_3$ initiates the transmission through the DME board interrogating device at the frequency $F_1$, of one or several pulses constituting a signal $I_3$ able, by means of the DME/T ground station, to cause the transmission of a response signal $I_4$ which initiates an exchange cycle of air-ground, then ground-air coded information between the aircraft which radiates $I_3$ and the ground station.

The DME/T ground station which usually comprises means for receiving the signals $I_1$ at the frequency $F_1$ transmitted by the mobile crafts and means for responding signals $I_2$ at the frequency $F_2$, further comprises, according to the present invention, means for discriminating between signals $I_1$ and signals $I_3$ transmitted at the same frequency $F_1$ by the mobile crafts under the above defined conditions, and transmitting at the frequency $F_2$ signals $I_4$ which respond to $I_3$ and are different from signals $I_2$.

One or several VORTAC stations (comprising a VOR radio beacon and a DME/T station) may be interlinked by means of telephone lines to a regional control station. The following additional means may be included in each VORTAC station or collected at the regional control station, certain means being simultaneously included within the determined VORTAC stations and the regional control station:

Means for coding signal $S_p$, securing in the absence of a responding signal $I_3$, a modification of signal $S_p$ from a rotation to the following rotation of the cardioid pattern as stated above and, in case of reception of one or several signals $I_3$, the repetition of the same signal $S_p$;

Means for radiating signal $S_p$ at a determined time of the rotation of the radio beacon cardioid pattern;

A television tube providing a display of the positions of the mobile crafts around a VORTAC station determined by a circular or spiralled sweeping such as the spot is rotating in phase with the radio beacon cardioid pattern around the center of the screen at a distance thereof depending upon $p$, and lighted by signals $I_3$;

Means for storing under coded form messages intended for the aircrafts pointed out by their call signal;

Means for receiving coded messages from the aircrafts moving in the controlled space from the ground station under consideration and means for comparing the call signal included in each of the coded messages to the stored call signals;

Means for radiating in reply to each of the coded messages above mentioned, a coded communication comprising the stored messages for the aircraft having the corresponding call signal.

The localization of the mobile aircrafts is thus obtained, either in polar coordinates with respect to the VORTAC station, or in azimuth of the station and in altitude, and this may be interesting for certain air radio navigation control purposes. A coded information exchange cycle is set up between the ground station and each of the mobile stations by turns according to the value of the number $p$ to which they respond and, with an equal value of $p$, in the order of their azimuths increasing with respect to the VORTAC station.

The interlink between a VORTAC station and the regional control station is realized through a four-wire telephone line, one pair of which for each transmission direction.

By means of the conventional methods for passing from a wide pass-band to a narrow pass-band of the telephone lines (for instance telegraph signal regenerators), such interlinks provide the 750 bauds bilateral routing of the coded information from or to the mobile stations, between the regional control station and the VORTAC stations. Such interlinks provide also, in the intervals between these coded information, the transmission in one direction or the other, and by switching, for control purpose, in the two directions, of synchronizing signals $S_p$ and $f=30$ c.p.s. signals between the VOR beacons and the panoramic displays, the appropriate phase-shifts being then introduced in order to compensate for the transmission durations of these signals in the telephone lines. More particularly, the 30 c.p.s. synchronizing signals may be easily transmitted by an appropriate coding, from the regional control station towards the VORTAC stations during the numerous dead times between the relatively scarce messages from the control station to the aircrafts and from the VORTAC stations towards the control station during a dead time reserved between the end of each cycle $S_p$ (number $p$ being a maximum) and the starting of a new cycle $S_p$ ($p=1$).

The utilization of such interlinks thus provides an arrangement for the synchronization of all the VORTAC stations of the same zone on a single 30 c.p.s. reference signal generated at the regional control station.

The invention will now be described in detail with reference to the annexed drawings in which.

Figure 1:
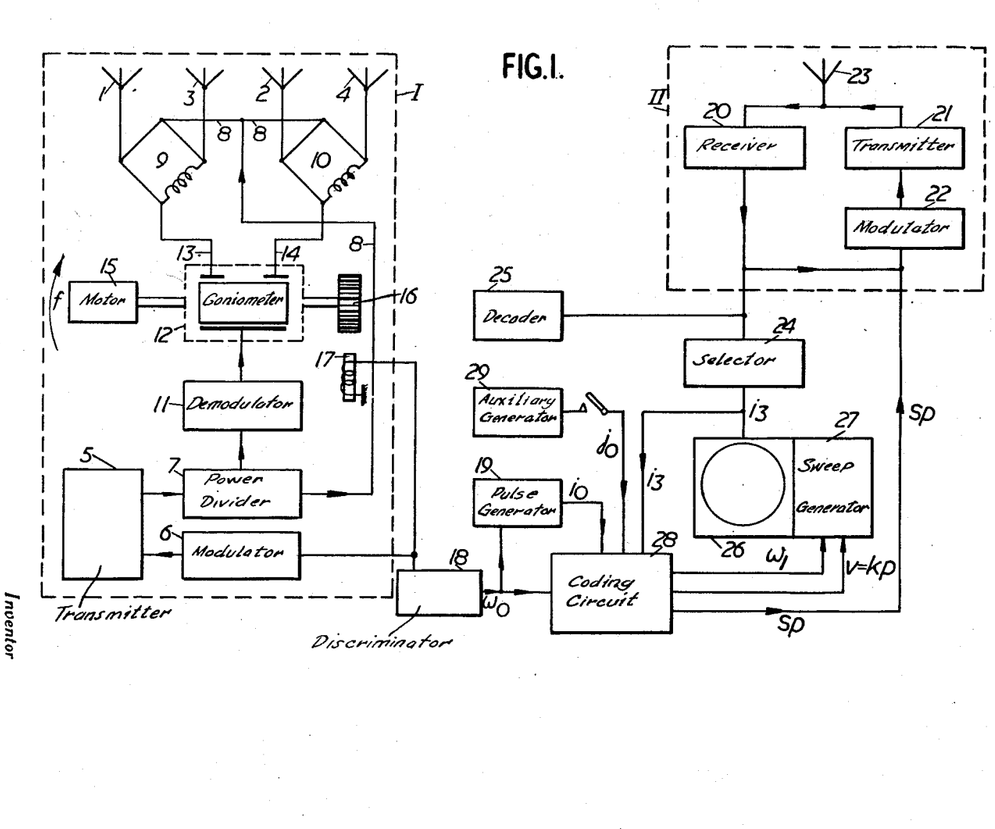
FIGURE 1 is a schematic diagram in block form of a rotative beacon of the VOR type and an associated DME/T responder, constituting a VORTAC station together with the additional ground equipments according to the invention.

Referring to FIGURE 1, a VOR of conventional type, such as those normaly utilized in the Civil Aviation, is shown inside a dotted line frame I. It comprises four antennae 1, 2, 3, 4 in the upper part of a square, the antennae 1 and 3 on the one hand, and the antennae 2 and 4 on the other hand, being diagonally opposed. These four antennae are supplied on the one hand in phase by a very high frequency carrier wave F which is modulated by a signal at the frequency $f$ and, on the other hand, with appropriate respective phases, by the same non-modulated carrier wave. The very high frequency energy is provided by the transmitter 5, modulated by the modulator 6. The output of this transmitter is connected to the power divider 7 having two outputs. The first output is connected to the feeding line 8 which supplies in phase the antennae through the balanced bridge arms 9 and 10, by the reference wave doubly modulated at the frequencies F and $f$. The second output is connected to the demodulator 11 the purpose of which is the elimination of any modulation and the restoring of the pure carrier wave, then to the capacitive goniometer 12 from which proceed the feeding lines 13 and 14 which supply the antennae 1–3 and 2–4 through the bridge arms 9 and 10 introducing appropriate fixed phase-shifts. The capacitive goniometer 12 is driven into rotation at the angular rate of $f$ rotations per second, by means of the motor 15. This motor also drives the phonic wheel 16 the cogs of which are suitably cut in order to induce in the coil (pick up) 17 an alternating current at the frequency F frequency-modulated at the frequency $f$. This current applied to the modulator 6 amplitude-modulates the wave generated by the transmitter 5.

By way of example, in the conventional VOR, there have been selected:

$$F=9,960 \text{ c.p.s.}$$
$$f=30 \text{ c.p.s.}$$

According to the present invention the VOR is completed as follows:

A discriminator 18 extracts from the signal coming from 17 a sine signal at the frequency $f$; this discriminator is followed by a pulse generator 19 which generates a pulse $i_0$ at the time in which a sinusoid passes through zero by increasing values. Circuits intended to produce pulses having a phase relationship with a sine signal are already known in the prior art, such as those described in paragraphs 15–12, pages 477–484 of the volume of Jacob Millman and Herbert Taub, entitled "Pulse and Digital Circuits," McGraw-Hill Book Company, Inc., New York 1956.

The pulse generator 19 may be constituted by such circuits or by a Schmitt trigger followed by a differentiating circuit controlling a monostable circuit. The pulse $i_0$ produced by the pulse generator 19 is utilized in the DME/T described hereinafter with reference to FIGURE 1. There has been shown inside the dotted line frame II a DME/T responder of conventional type, in which the receiver 20 receives by means of antenna 23 signals $I_1$ for the interrogation of the crafts, detects and applies said signals to the modulator 22 of the transmitter 21. This transmitter radiates said signals $I_1$ at the frequency $F_2$ by means of the said antenna 23.

According to the present invention, the DME/T responder is completed as follows:

At the input of modulator 22 is connected the output of a coding circuit 28 provided to make up a signal $S_p$ characterized by an integer $p$ and to deliver this signal when the pulse $i_0$ is received, coming, as stated above, from pulse generator 19 at the passage time of a characteristic point P of the VOR cardioid pattern through the north of the station. It is also possible to define $S_p$ as follows. Assuming that the space controlled by the beacon has a radius of 100 miles, the beacon calls, for example, successively the aircrafts at a distance inferior to 1 mile, then those situated between 1 and 2 miles . . ., then those between $p-1$ and $p$ miles . . ., up to those between 99 and 100 miles. For doing it, the beacon radiates signals containing successively the information 1, then 2 . . . $p$ . . ., 100, these signals being coded and referred to in the present specification as $S_1, S_2, S_p \ldots S_{100}$. As each aircraft knows its distance $\rho$ to the beacon obtained from its DME/T equipment, each aircraft can reply to the beacon when this distance is called by the beacon.

Instead of calling the aircrafts according to the distance with respect to the beacon, they may be called according to their altitudes $h$. The beacon may call for example aircrafts at an altitude lower than 1000 feet, then those between 1000 and 2000 feet . . . and so on. In this case the beacon radiates signals containing the information 1, then 2, $p$ . . . These signals are coded and for convenience purposes referred to as $S_1 \ldots S_2 \ldots S_p \ldots$ as previously.

These signals $S_p$ are radiated by the transmitter 21 and the antenna 23 at the frequency $F_2$. As stated hereinafter with reference to FIGURE 4 which represents the equipments of the mobile stations, the signals $S_p$ allow the crafts being, for instance, at a distance $\rho_p$ from the station, to transmit a coded signal $I_3$ at the frequency $F_1$ at the time in which the characteristic point P of the VOR cardioid pattern passes through their azimuth.

At the output of the receiver 20 of the DME/T which receives the signals at the frequency $F_1$, the decoder 25 is added which translates the coded information of signal $I_3$, for instance approximate altitude information of the transmitting craft, and the selector 24 which selectively applies the pulses $i_3$ which are deduced from the signal $I_3$, on the one hand to coder 28 of the signal $S_p$ for avoiding this signal be modified at the time of the following transmission and, on the other hand, to the grid of cathode screen tube 26, the scanning of which is controlled by the sweep generator 27 depending upon:

(a) A voltage V proportional to number $p$ coming from the coder 28 and which determines the distance of the spot from the center of the screen, (b) A signal synchronized with the rotation of the VOR cardioid pattern coming from discriminator 18 possibly corrected by a phase-shift $\omega_1-\omega_0$ proportional to number $p$ and which determines the cathode beam rotation.

The purpose of this correction, applied when number $p$ corresponds to a distance is to compensate the azimuthal error which would affect the position of the points on the screen lighted by the pulses $i_3$ with respect to the azimuth of the transmitter craft due to the duration of the signal course.

If for each number $p$ is associated a distance $\rho_p$, for instance if $p$ is comprised between 0 and 300, this means that number $p$ corresponds to a distance of the station equal to $p$ kilometers, and it can be stated that signals $I_3$ cause on the screen 26 an azimuth and distance pointing of the crafts with respect to the station and therefore a panoramic display of their positions.

The signal $S_p$ is constituted by a first burst of impulses which characterizes it (for instance a pair of pulses characteristically spaced) then, either a certain number of pulses representing the number $p$ in a binary code with the redundances necessary for the reliability of the transmission or two pulses or pulse pairs separated by a period of time proportional to number $p$.

These examples are not limitative and the signal $S_p$ may be constituted in any manner providing regeneration on board of the crafts by appropriate decoding of the value of $p$ and identification of the magnitude to which it must be compared.

More particularly, the adjunction to the board equipments of the mobile crafts of a generating device of number $p$, analogous to the device mentioned above in connection with the ground stations and which will be described hereinafter, permits the signal $S_p$ to be transmitted by the ground station up to its first characteristic pulse burst and to limit its transmission to times corresponding to the increase of number $p$ by one unit.

Whatever may be the system selected and the value of $p$, the signal $S_p$ always comprises as first pulse a pulse synchronized with pulse $i_0$ generated by the pulse generator 19 and applied to the coder 28. The numbers $p$ are coded by coder 28 in the increasing order of the natural numbers at the rate of pulses $i_0$ which are received from the pulse generator 19 in the absence of signal $I_3$ generated by a mobile craft responding to the last signal $S_p$ i.e. to the preceding coded value of number $p$, as it will be explained in detail hereinafter. The maximum number selected for $p$ is followed, after a possible dead time, by number 1 followed by a series of natural numbers in order to establish a continuous sequence of cycles $S_p$.

If, for instance, the maximum of the number $p$ is fixed at 300, the time period necessary for a complete cycle is, in the absence of any signal $I_3$, $300 \times \frac{1}{30} = 10$ seconds increased by the possible dead time. The auxiliary generator 29 (FIGURE 1) of pulses $j_0$ permits to an operator to set the sweeping in a determined zone by the quick passing of a certain number of values of number $p$ without waiting for the normal cyclic return of the corresponding values of $p$.

In order to simplify the course of the specification, $p$ associated with a distance $\rho_p$ will be considered. The modifications to be made to the apparatus then described in order to correspond equally to the case wherein $S_p$ is associated with an altitude or flight level are easily deduced.

$p$ being associated with a distance $\rho_p$, the coder 28 of number $p$ assumes a double function:

(1) Coding the sequence of number $p$ at each reception of a pulse $i_0$ or $j_0$;
(2) Introducing in the sweep generator 27:

(a) A voltage V proportional to $p$;
(b) A sine voltage phase-shifted proportionally to $p$ on on the voltage synchronized with the beacon cardioid pattern rotation supplied by the discriminator 18.

Figure 2:
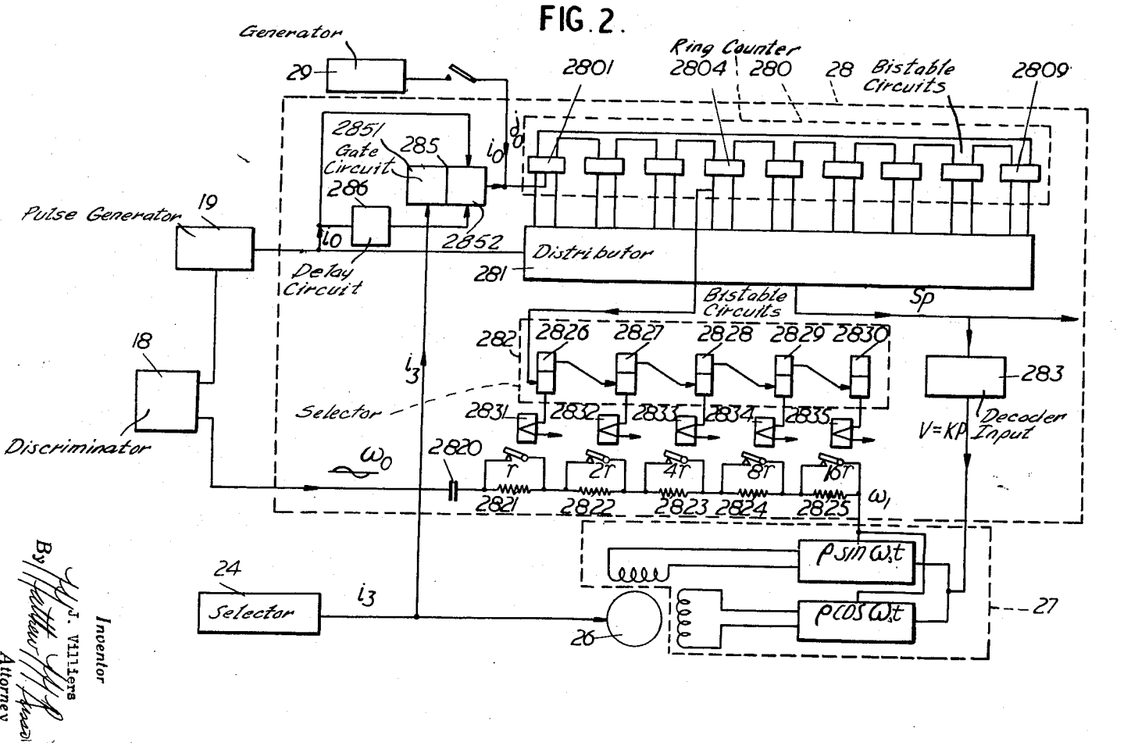
FIGURE 2 is a detailed diagram of some additional equipments of FIGURE 1.

The whole of these operations is explained hereunder in relation with FIGURE 2 in which a ring counter 280 comprising for instance nine bistable circuits 2801–2809 receives from the pulse generator 19 some pulses $i_0$ under the control of the gate circuit 285. The counter 280 may also be controlled at an accelerated rate by pulses $j_0$ coming from generator 29. Pulses $i_0$ coming from pulse generator 19 are then applied to the distributor 281 of signal $S_p$ and initiate the transmission of this signal. Signal $S_p$ beginning, as already stated, by a first pulse burst characterizing it, the positioning of counter 280 is completed before the transmission of the $p$ coded pulses. The distributor 281 which receives in parallel the characteristic potentials of the position of bistable circuits 2801–2809 and which, under the control of a triggering pulse $i_0$, sequentially delivers signals representative of these potentials, is a conventional device in the switching apparatus art and has not to be described in the present specification. Signal $S_p$ is applied, on the one hand, either directly in a binary form, or after translation in a different code, to the modulator input 22 and transmitted via the transmitter 21 by the DME/T antenna 23, and on the other hand to decoder input 283 which translates the number $p$ into a voltage V proportional to its value. This voltage is applied to the sweep generator 27.

The gate circuit 285 prevents the advancement of counter 280 by blocking the pulse $i_0$ when a pulse $I_3$ is received during the cycle $S_p$.

Figure 3:
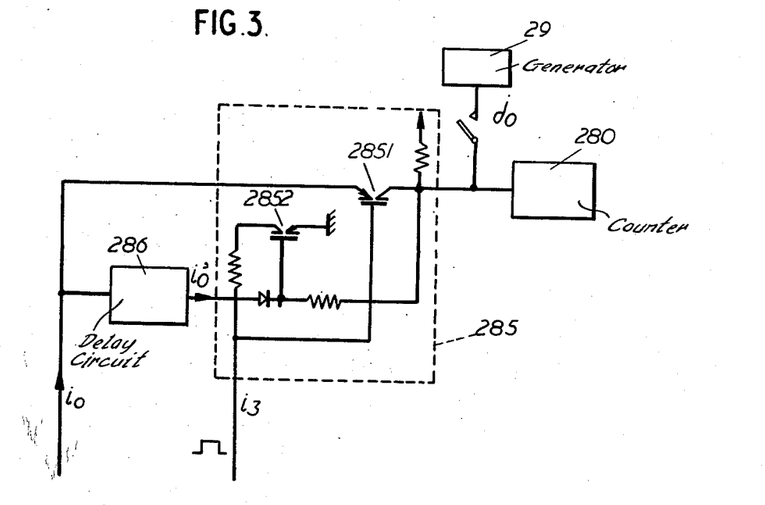
FIGURE 3 shows a schematic arrangement of a particular circuit represented under a symbolic form in FIGURE 2.

The gate circuit 285 is constituted by a bistable circuit which, for instance, may comprise, as shown in FIGURE 3, two transistors 2851 and 2852, the first of which is blocked when a pulse $i_3$ is applied to its base electrode. Pulse $i_0$ is applied to the emitter of transistor 2851 wherein the said pulse is blocked, and pulse $i_0'$ delayed with respect to $i_0$ by the duration of the latter by means of delay circuit 286 is applied at the base electrode of transistor 2852. The bistable circuit 285 then switches its condition and the following pulse $i_0$ is transmitted by the collector of the transistor 2851 to the counter 280 which advances one unit if no other new pulse $I_3$ has appeared. This circuit described as a non-limitative example may be replaced by any other conventional electronic switching circuit able to assume the same function.

The symbolic illustration utilized in FIGURE 2 for representing the gate circuit 285 will be also utilized in the present specification in order to illustrate similar circuits. In order to introduce the required phase-shift in the sine voltage applied to the sweeping generator 27 with respect to the cardioid pattern rotation depending upon the distance associated to number $p$, a reduced number of cells RC may be provided by proceeding by successive stages, for instance in the following manner:

The sine signal at the frequency $f$ coming from the discriminator 18 (FIGURE 1) is applied to the sweep generator 27 via a delay circuit constituted by a condenser 2820 and some resistances 2821–2825 determined by the selector 282 depending upon number $p$. The selector 282 may be constituted by a counter of five bistable circuits 2826–2830 controlled by pulses coming, for instance, from the fourth bistable circuit 2804 of counter 280 each time the said bistable circuit is switched into the set condition, i.e. each time number $p$ is increased by sixteen units. The switching into set condition of each one of the bistable circuits 2826–2830 energizes one of the relays 2831–2835 which is connected to the said bistable circuit, and this causes the unlocking of the contact shunting one of the resistances 2821–2825 which corresponds to it and consequently the introduction of said resistance in the delay circuit. Each one of these resistances has a value double of the preceding one in the order of the bistable circuits to which they are associated. The resistance 2821 has a resistance $r$ such that the cell constituted with the condenser 2820 causes the phase shift corresponding to the incident and reflected Hertzian course of $2^4 = 16$ kilometers, say 106 $\mu$s.

The resistance 2822 has a value of $2r$, the resistance 2823 a value of $4r$, the resistance 2824 a value of $8r$ and the resistance 2825 a value of $16r$.

Each time the number $p$ increases by $2^4 = 16$ the value of the total resistance connected to the condenser 2820 is multiplied by a number increasing by one unit and the phase shift $\omega_1 - \omega_0$ applied to the sine signal supplied by the discriminator 18 is increased by 106 $\mu$s.

Figure 4:
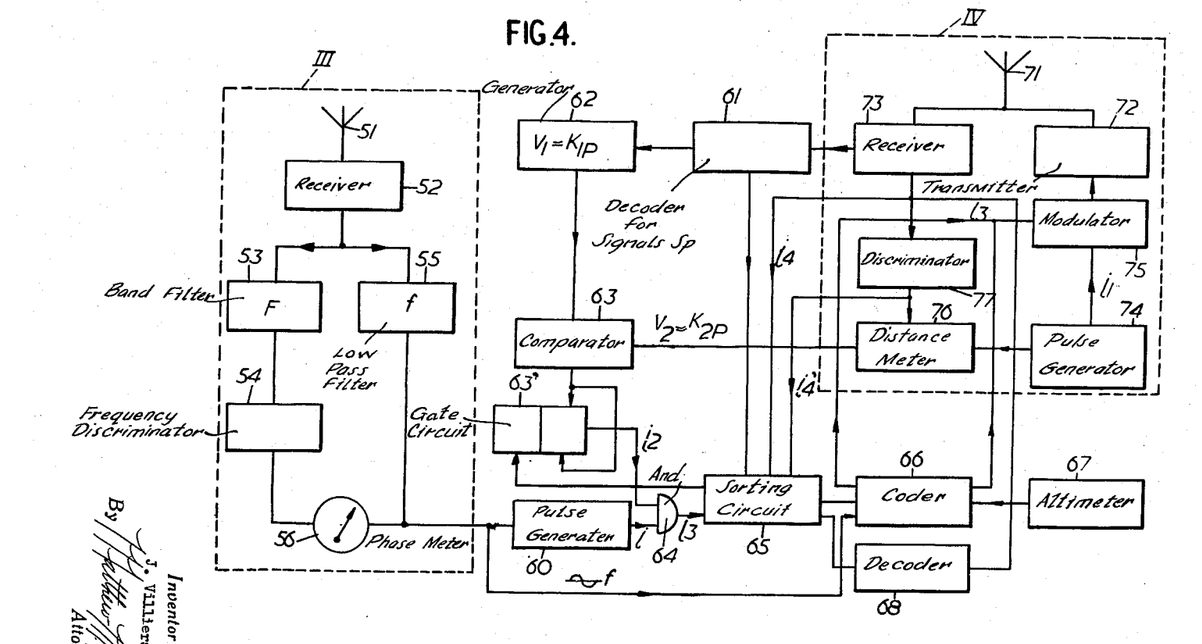
FIGURE 4 shows in block form diagram the known VOR and DME equipments of a mobile station associated with the additional board equipments according to the invention.

Referring to FIGURE 4, there is shown inside the dotted line frame III a conventional very high frequency VOR receiver provided in order to supply to the mobile craft wherein it is installed, the azimuth of the said craft with respect to the VOR. This receiver comprises an antenna 51, a so-called receiver 52 connected on the one hand to a band filter 53 having a central frequency equal to F, followed by a frequency discriminator 54 yielding the reference signal at the frequency $f$ and, on the other hand, to a low-pass filter 55 yielding the measure signal at the frequency $f$ generated by the cardioid pattern rotation. The two channels on which the reference signal and the measure signal are respectively obtained, are connected to a phase meter 56 which supplies the craft azimuth, as it is well known.

According to the invention, the output of filter 55 of the measuring channel is connected to the pulse generator 60 which produces a pulse $i$ of duration $\tau$ each time the sinusoid representing the measuring signal at the frequency $f$ passes through zero in a determined direction, for instance, by increasing values.

The generator 60 may be similar to the generator 19 already mentioned.

The pulse $i$ coming from the pulse generator 60 is equivalent to the pulse which is produced at the output of the receiver should the antenna 51 be swept by a $d\theta$ width beam rotating at the same rate as the cardioid pattern, the value $d\theta$ being related to the duration $\tau$ of the pulse $i$ by the relation:

$$d\theta \text{ degrees} = f \times 360\tau$$

wherein $\tau$ is expressed in seconds. As an example, in order to obtain an opening of "equivalent beam" of 3° 25' with the value $f$ already proposed, the width $\tau$ of the pulse $i$ must be 300 $\mu$s.

Figure 5:
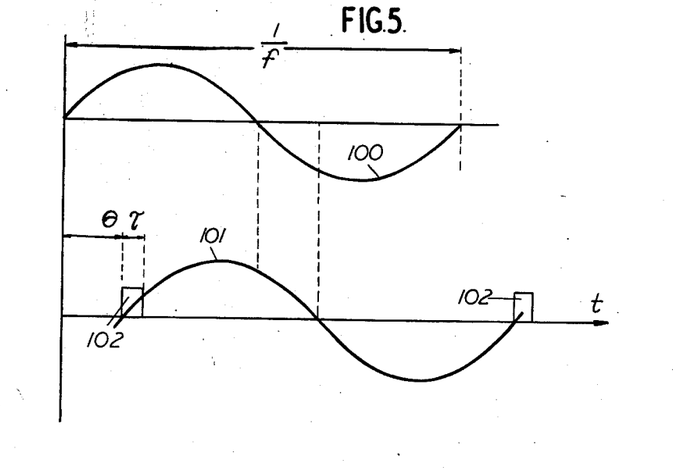
FIGURE 5 is a diagram helpful in the explanation of this invention.

On FIG. 5, at the frequency $f$ the reference sine signal 100 represents the signal obtained at the output of the frequency discriminator 54, 101 represents the signal obtained at the output of filter 55 when the mobile craft is in a determined azimuth $\theta$, and 102 represents the pulses $i$ of duration $\tau$ which are produced from the signal 101 by the pulse generator 60.

Returning to FIG. 4, the conventional board distance measuring equipment DME is shown inside the dotted line frame IV. It comprises the antenna 71 connected to the transmitter 72 and the receiver 73. The pulse generator 74 actuates the modulator 75 in order to transmit interrogation signals $I_1$ from the DME and simultaneously applies triggering pulses to the so-called distance meter 76. The response signals $I_2$ from the responder beacon DME/T selected by the discriminator 77 are applied to the distance meter 76 which delivers a voltage $V_2$ proportional to the measure distance $\rho$ and continually depending upon the variations of this latter.

The discriminator 77 is a tracking device of the response signal $I_2$ which, after a search period, permanently positions an electronic gate which allows only the passage for the pulses $I_2$ separated from the craft signals $I_1$ by a constant time interval. With each mobile station transmitting its interrogation signals $I_1$ systematically at irregular intervals, the response signals $I_2$ which pass through the said electronic gate may be considered on board of each mobile craft as responding to its own interrogations $I_1$.

"Total video" means the set of video frequency signals coming from the board DME receiver, and "filtered video" the only signals selected in the total video by the said electronic gate.

According to the invention, the decoder for signals $S_p$ 61 is connected at the output of receiver 73 and applies signals $S_p$ suitably converted to the generator 62 which supplies a voltage $V_1$ proportional to number $p$. This voltage is applied to comparator 63 which receives further the voltage $V_2$ proportional to the distance measured by the DME from the distance meter 76.

When $V_2 = V_1$ the comparator 63 supplies a pulse switching in set condition a bistable circuit 63' which then delivers a permanent signal called afterwards pulse $i_2$, and which remains, as seen later, until the rotating radius vector passes over the aircraft (signal called afterwards $i_3$).

The output of impulse generator 60 and bistable circuit 63' are connected to a coincidence circuit of type "AND" 64. During the cardioid rotations wherein the pulse $i_2$ is present at an input of gate 64, this latter delivers a pulse $i_3$ during the duration $\tau$ of the pulse $i$ appearing at its second input.

The pulse $i_3$ applied under the control of the sorting circuit 65 and after transformation by coder 66 to the modulator 75, causes the transmission of a signal $I_3$ at frequency $F_1$ via the transmitter 72 and the antenna 71. The function of coder 66 is to render the signals $I_3$ triggered by $i_3$ easily discriminated, by the ground station, from the normal interrogation signals $I_1$ and further to include an information to be transmitted from the craft to the ground as, for instance, the altitude of the craft. The signal $I_3$ may thus be constituted by several suitably spaced pulse pairs in order to be used as digital or analogic coding of the information to be transmitted under the control of the altimeter 67 represented as an example, or any other board instrument. Moreover the pulse $i_3$ resets the bistable circuit 63' thus terminating pulse $i_2$.

The duration of the signal $I_3$ is limited to the duration $\tau_3$ of the pulse $i_3$ which is equal to the duration $\tau$ which determines the separating power in azimuth $d\theta$ of the present device. In the example selected above which $d\theta = 3°\ 25'$ for $f = 30$ rotations per second, the duration $\tau$ is 300 $\mu$s. This time period permits to each craft to transmit a response $I_3$ which may contain a simple coded information such as for instance its altitude.

The reception of a signal $I_3$ by the ground station DME/T causes the transmission of a signal $I_4$ under the same conditions and at the same frequency $F_2$ as for the usual response signals $I_2$. The signal $I_4$ however has a characteristic easily identified by the mobile stations and may be, for instance, an exact repetition of signals $I_3$.

Figure 9:
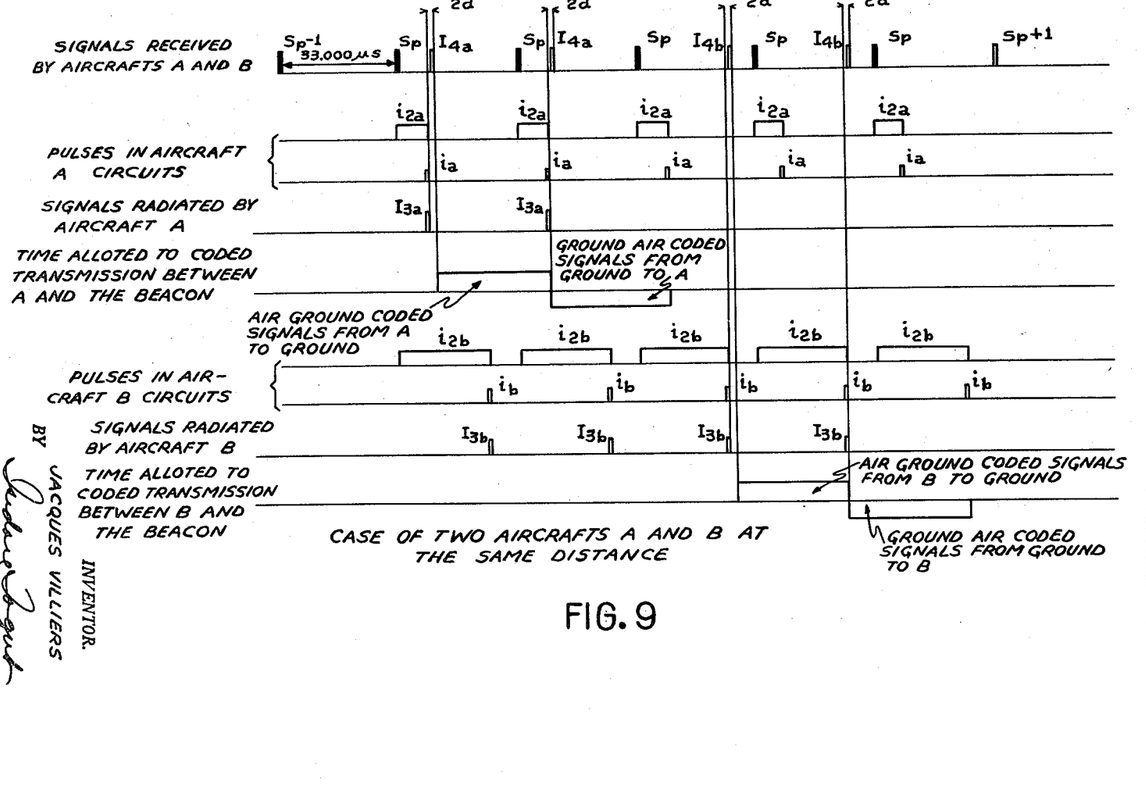
FIG. 9 is a graph of waveforms useful in understanding the operation of this invention.

Each one of the mobile stations located at the distance $\rho_p$ transmits, as already stated, a signal $I_3$ at the time when the characteristic point of the VOR beacon cardioid pattern or otherwise stated the equivalent beam passes through its azimuth. The signals $I_3$ are thus transmitted by the various mobile stations at a distance $\rho_p$ of the ground station and received therein in the azimuth order of the said mobile stations. The response signals $I_4$ to the said signals $I_3$ are therefore equally classified in the azimuth order of the mobile crafts and each one of the signals $I_4$ reaches all the mobile stations at a distance $\rho_p$ at the same time. The discriminator 77 of the conventional DME equipments of the mobile stations selects the signals $I_4$ in the same manner as the signals $I_2$ whereby pulses $i_4$ appear in the filtered video of each mobile station under the effect of signals $I_4$ responding to its own signals $I_3$. As noted above, signals $I_1$ and $I_2$ are those usually exchanged between each DME/T airborne equipment and the beacon permitting each aircraft to obtain its distance $\rho$ to the beacon. With reference to FIGURE 9, there is shown the relationship of the signals $S_p$, $I_3$ and $I_4$ transmitted as shown in FIG. 9 by the beacon and two aircraft A and B. The drawing shows a sequence of signals $I_3$ and $I_4$ with respect to the signal $S_p$ for the case of two aircraft A and B located between distances $p$ and $p+1$. For purposes of explanation, the bearing of aircraft A is approximately 120 degrees and the bearing of aircraft B is approximately 240 degrees.

The sorting device 65, described hereinafter in relation with FIGURE 6, triggers a cycle of coded information air-ground, then ground-air, between the ground station and each one of the aircrafts at a distance $\rho_p$ successively in their azimuth order increasing from the north.

Figure 6:
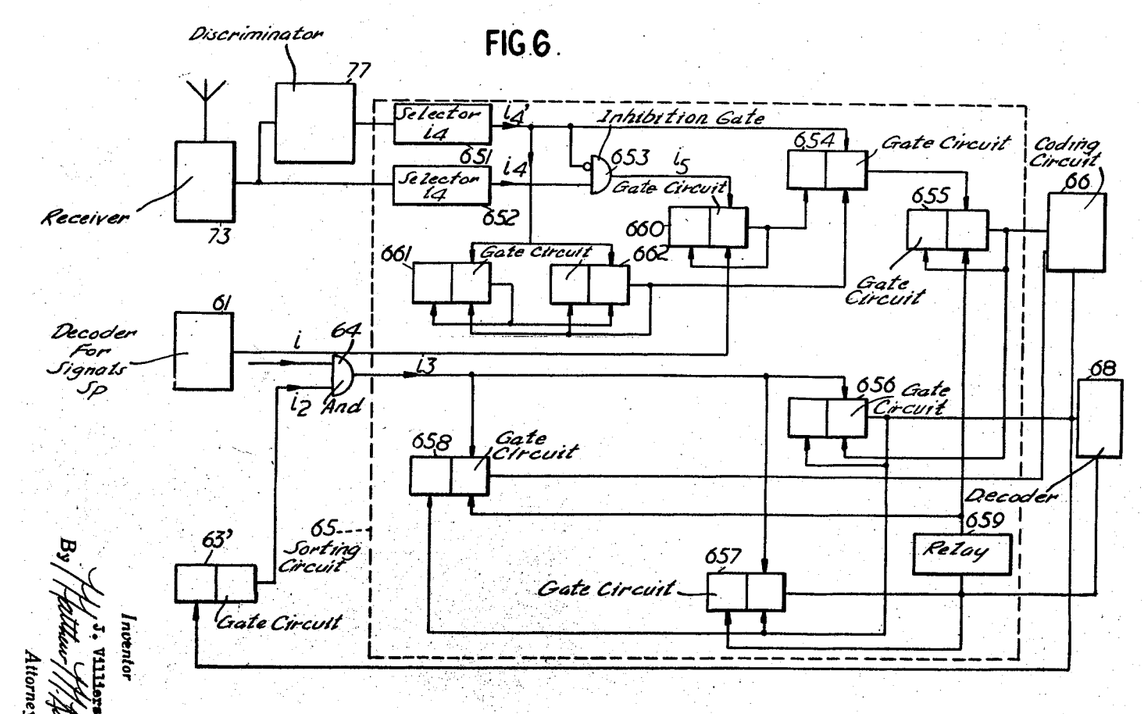
FIGURE 6 is a detail diagram of some additional equipments of FIGURE 4.

In FIG. 6, gate circuits similar to the circuit 285 of FIG. 3, have been schematically represented as the circuit 285 of FIG. 2, under the form of a bistable circuit of which the right element is unblocked or blocked according to the lower right or left input where the last positioning pulse is applied.

At the output of receiver 73 of the board DME equipment is connected circuit 652 which selects in the total video the pulses $i_4$ which appear when a signal $I_4$ is received. In the same way, at the output of the discriminator 77 is connected circuit 651 which selects in the filtered video, pulses $i_4'$ appearing when a signal $I_4$ which responds to a signal $I_3$ of the considered craft, is received.

In their azimuth order increasing from the north of the VOR radio beacon, $n$ aircrafts $A_1$, $A_2$ ... $A_n$ are considered admitting the code $\rho_p$, i.e. located between $p$ and $p+1$ kilometers from the ground DME/T station. During the duration of the first cardioid pattern rotation numbered $p$ each one of the aircrafts in the same order transmits a signal $I_3$. The first signal $I_4$ responding to the aircraft $A_1$, a pulse $i_4'$ appears in its filtered video in the same time as a pulse $i_4$ appears in its total video. This pulse $i_4'$ is transmitted via gates 654 and 655 which are, as it will be seen hereinafter, then unblocked to the coding circuit 66, initiating the cycle of coded information exchange with the ground station.

The same first signal $I_4$ of the first cardioid pattern rotation numbered $p$ causes pulse $i_4$ in the total video of the crafts $A_2$ ... $A_n$ with the exclusion of a pulse $i_4'$ in their filtered video. The inhibition gate 653 of these crafts produce then a pulse $i_5$ which passing through the gate 660 open at the beginning of each cardioid pattern rotation by a pulse coming from the $S_p$ decoder 61, recloses immediately said gate 660 and blocks the gate 654 thus preventing further pulse $i_4'$ to have access to the coding circuit 66. The said prevention is valid for two cardioid rotations; in fact the pulse $i_4'$ relating to the response $I_4$ to the signal $I_3$ of any one of the aircrafts $A_2 \ldots A_n$ in the first cardioid rotation numbered $p$, passes via gate 661 for blocking it immediately and unblocking the gate 662. At the following cardioid pattern rotation, the pulse $i_4'$ passes via gate 662 for reclosing it immediately, opening the gate 661 and opening the gate 654. Gates 661 and 662 having time constants at least equal to the duration of pulses $i_4'$, the third pulse $i_4'$ can only pass via gate 654 and eventually initiate a coding cycle.

It will thus be seen that at the first cardioid pattern rotation numbered $p$, all the aircrafts considered except the first from the north are held over for two cardioid pattern rotations computed from the passage of the equivalent beam in their bearing.

The coding-decoding cycle of the aircraft $A_1$, initiated by the passage of a pulse $i_4'$ via gates 654 and 655 up to the coding circuit 66, proceeds in the following manner:

The pulse $i_4'$ having passed via gate 655 blocks it immediately and unblocks gate 656 initially blocked.

When the beam passes a second time over the aircraft $A_1$, the "AND" gate 64 supplies a new pulse $i_3$ since, as already stated, the signal $S_p$ has been repeated by the ground station without any modification of number $p$.

This pulse $i_3$ transmitted via gate 653 to coder 66 causes the transmission of a new signal $I_3$. The pulse $i_3$ is further transmitted in parallel to unblocked gate 656 and to blocked gate 657. After having passed via gate 656, the pulse $i_3$ blocks it as well as gate 653, unblocks gate 657 and is applied on the one hand to coder 66 preventing renewal of the coding cycle and, on the other hand, to decoder 68 operated by it.

When the beam passes a third time over the aircraft $A_1$, this latter does not transmit any signal $I_3$, the pulse $i_3$ being unable to pass via blocked gate 658. The pulse $i_3$ is however applied to gates 656 and 657, the first of which is blocked and the second unblocked. The pulse $i_3$ going out from gate 657, blocks it and stops the decoder 68, then through one second delay relay 659, it unblocks gates 655 and 658 which blocked any transmission from the aircraft $A_1$. When an aircraft which has its data exchange turn, is thus excluded from the system, the said delay is necessary for leaving to all the aircrafts responding to the same number $p$ time to satisfy successively their coding-decoding cycle. A one second delay permits fifteen aircrafts responding to the same number $p$ to have each one its turn before the first among them can restart its coding cycle.

It has been stated that when the beam passes through the azimuth for the third time, the aircraft $A_1$ does not transmit any signal $I_3$. Consequently, the first signal $I_4$ transmitted by the ground station at the third cardioid pattern rotation numbered $p$, responds to the signal $I_3$ of the aircraft $A_2$ which performs immediately its coding-decoding cycle according to the identical process which has been described for the aircraft $A_1$, while each one of the aircrafts $A_3 \ldots A_n$ has again the access to its coding circuit prevented for two cardioid pattern rotations by a pulse $i_5$ blocking the gate 654.

It is possible to have an interference between the coding-decoding cycles of two aircrafts only if the signals $I_4$ assigned to each one of the aircrafts has been separated by less than the duration of the impulse $I_3$ i.e. if the azimuth space between two aircrafts located at the same distance $\rho_D$ from the DME/T station has not exceeded a few hundredths of a degree.

In order to transmit information the transmission time of which exceeds 31 milliseconds at 750 bauds without exceeding this rate, it is easy to allot to each coding cycle and to each decoding cycle more than one pattern rotation.

In order that each one of the coding and decoding cycles lasts two rotation periods, i.e. $2/30$ of a second, it is enough to provide two bistable circuits in cascade instead of each one of the bistable circuits 656, 657, 661, 662, and to substitute for the simple disc 662 described hereinafter in relation with FIGURE 7 a pair of successive reading discs.

The transmission of the stored information in the coder 66, namely signals $I_3$ and the coded messages containing the call signal of the considered aircraft and the other information assigned to the ground station, may simply be monitored by the common 30 c.p.s. signal, with a phase shift known as proportional to number $p$, at the VORTAC station and the aircrafts responding to number $p$.

In fact, a signal $I_3$ is transmitted when a pulse $i$ indicates for the considered aircraft the passage through zero for increasing values of the 30 c.p.s. measuring sinusoidal signal and the beginning of the coding cycle intervenes at the reception time of the response signal $I_4$ to a signal $I_3$, e.i. at the latest, when the considered aircraft being at the limiting distance from the VORTAC station, $p$ is equal to 300, two milliseconds after the transmission of the signal $I_3$.

Figure 7:
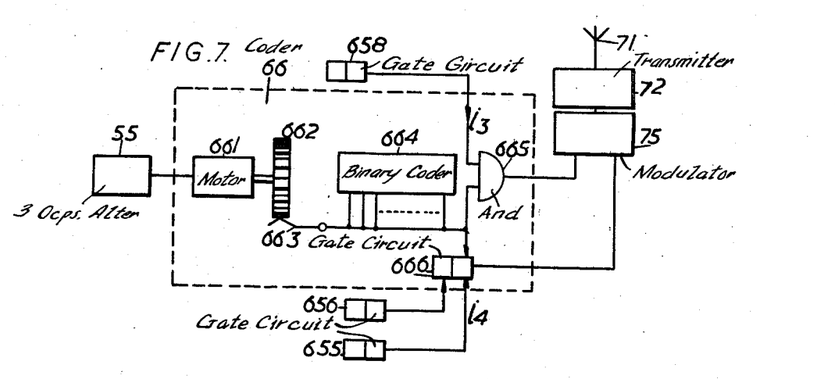
FIGURE 7 is a schematic diagram of a particular embodiment of a circuit of FIGURE 4.

As shown on FIGURE 7, the coder 66 comprises a motor 661 rotating in synchronism with the 30 c.p.s. measuring signal supplied by the filter 55. The motor 661 drives the disc 662 suitably adjusted on its shaft, and the configuration of which provides, in the course of its rotation, due to a brush reading device or conventional photoelectric cell 663, a sequence constituted by:

(1) A pulse group characteristic of signal $I_3$ and reading pulses of the binary coder of the coded information which is comprised in this signal (for instance approximate altitude) lasting totally 300 $\mu$s.

(2) A waiting period of 2 milliseconds for the eventual reception of a signal $I_4$ responding to the signal $I_3$ mentioned above, i.e. a pulse $i_4'$.

(3) Pulses characteristic of the call signal of the considered aircraft, followed by the reading pulses of binary coders such as 664 positioned according to the magnitudes or other coded information to be transmitted (precise altitude, course . . . ) during a delay which may reach 31 milliseconds.

The motor 661 and the disc 662 rotating continuously, the output of coder 66 is connected to the modulator 75 either by the "AND" gate 665, during the duration of pulses $i_3$ coming from the bistable circuit 658 (FIG. 6) for the transmission of signals $I_3$, or by means of the bistable circuit 666 analogous to the bistable circuit 285 of FIGURE 3, by the pulses $i_4'$ coming from the bistable circuit 655 for the transmission of the air/ground coded messages constituting a coding cycle which is terminated by a pulse provided by the bistable circuit 656 from the following pulse $i_3$.

During the decoding cycles which follow the coding cycles, as it is well known, it is possible to initiate by the ground/air transmission of a coded message, its instantaneous retransmission, pulse by pulse, by the aircraft in order to which the message is sent, to secure at the ground station a permanent control of the right reception of the aircraft by the comparison, pulse by pulse, of the retransmitted messages with the transmitted message suitably delayed by a proportional to $p$.

Figure 8:
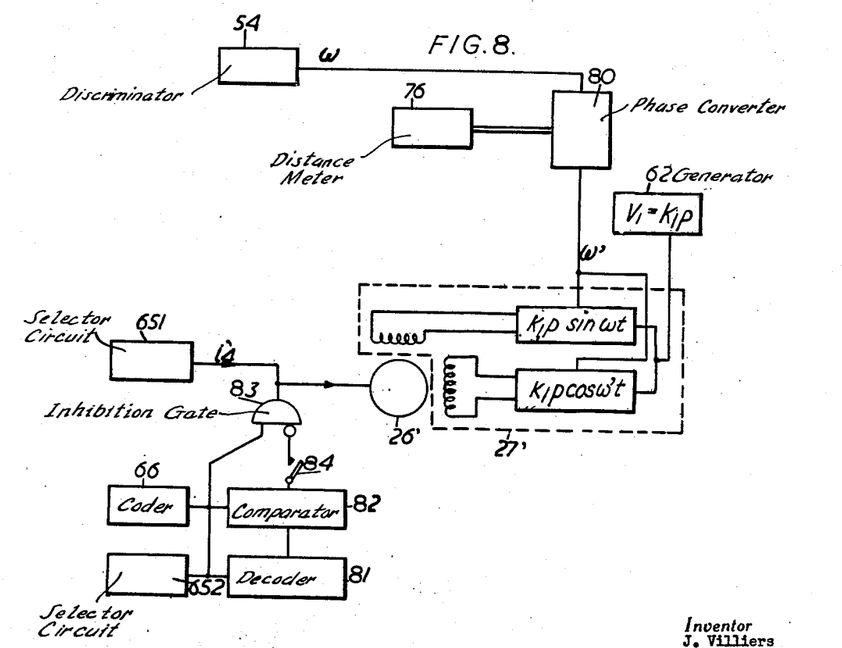
FIGURE 8 is a schematic diagram of an additional equipment of a mobile station.

Finally, FIGURE 8 shows how a route tracer device over a cathode screen may be placed at the disposal of the aircraft officers by the installation on board of a television tube similar to the tube 26 provided for the ground stations and operating in a similar manner.

The grid of tube 26' is connected, on the one hand, by means of the inhibition gate 83, to the output of circuit 652 (FIGURE 6) which causes, except for intentional inhibition as will be described hereinafter, the spot lighting by all the signal $I_4$ transmitted by the VORTAC station and, on the other hand, to the circuit 651 (FIG. 6) which causes an unconditional lighting and a particular spot lighting due to signal $I_4$ responding to signal $I_3$ from the considered aircraft. The decoder 81 of signals $I_4$ connected to the output of circuit 652 (FIG. 4) permits to decode the approximate altitude indication included in the signals $I_4$ as in the signals $I_3$ of which they are the repetition. The output of the decoder 81 is connected to the comparator 82 which receives on the other hand from the coder 66 (FIG. 4) the approximate coded altitude of the considered aircraft. When the approximate altitude decoded by the decoder 81 and the approximate altitude supplied by the coder 66 are different, the comparator 82 produces an output signal which may be applied by the manual contact 84 to the inhibition gate 83. The manual contact handling causes therefore on the screen 26' the suppression of the display of the position of the aircrafts positioned at approximate altitudes which differ from the altitude of the considered aircraft and leaves only the display of the position of the aircrafts navigating at the same altitude.

The sweeping potentials applied to the sweep generator 27' are measured on the one hand at the output of generator 62 (FIG. 4) which gives a voltage $V_1$ proportional to $p$, and on the other hand at the output of discriminator 54 (FIG. 4) giving the reference signal at the frequency $f=30$ c.p.s., by means of the phase converter 80 adjusted on the shaft of the distance meter 76 which carries the reading index of the conventional DME. This phase converter, thus positioned according to the distance $p$ measured from the aircraft to the VORTAC, phase shifts the 30 c.p.s. signal received from the discriminator 54 of an angle $\omega'-\omega=2\pi=\alpha,\alpha$ being the angle of which is rotated the VOR cardioid pattern during the Hertzian course between the aircraft and the VORTAC station and return. The beam rotation of the cathode tube 26' is thus rendered synchronous of the equivalent beam rotation of the VORTAC station and the position of the considered aircraft is represented on the screen 26' in azimuth and precise distance from the VORTAC station. The positions of the other aircrafts appear on the screen 26' with the larger angular error as their distance at the VORTAC station is more different from the distance of the considered aircraft. This distortion does not involve an important drawback, each aircraft being concerned by the precise position of the other aircrafts only when they are positioned in its proximity.

It will be noted that inverted with the displays supplied by the board radars, the displacement of the displays of the various aircrafts on screen 26' represents not their relative speed with respect to the considered aircraft, but their absolute speed.

The present invention has been explained by the description of a concrete embodiment adapted to the VORTAC radionavigation system, and in which the number $p$ is compared to a distance and in which the links used for the coded information exchange between the mobile stations and the ground stations are set up on the same channels and the same frequencies as the conventional signals of the DME/T. Numerous other embodiments may be imagined by those skilled in the art without departing from the scope of the invention, for instance:

Its adaptation to any other radionavigation system utilizing directly or indirectly at least a mobile position line;

Temporary or permanent modification of the value to be compared to number $p$;

Adoption of various coding techniques;

Or adoption of separate channels for carrying air/ground and ground/air coded messages, as in the interlink of AGACS type developed by the "Radio Corporation of America" under contract of the "Bureau of Research and Development of the Federal Agency."

What is claimed is:

1. A radio navigation system comprising a beacon station transmitting a rotatable directive radiation pattern producing the effect of a modulating wave pattern at a receiver and a reference wave pattern of a frequency related to said modulating wave pattern, a station carrying a receiver adapted to receive said radiation pattern and said reference wave pattern whereby a direction line from the station to the beacon can be established, means at said station for transmitting interrogation signals to said beacon, a responder at said beacon for transmitting pulses in response to said interrogation signals from said station whereby the distance of said station from the beacon can be determined at said station by comparison of the timing of the transmitted pulses and the interrogation signals from said station, means at said beacon for transmitting signals characterized for discrete distances from said beacon, each said discrete distance increasing with each said rotation of said radiation pattern until a desired maximum is reached, means at said receiver responsive to said characterized signals and the ascertained distance of said station from said beacon to establish in cooperation with means at said beacon a time period for exchange of information between said station and said beacon and means to permit all stations responding to the same distance signal to reply in turn to the beacon interrogation.

2. In a system according to claim 1 further means on said station comprising means to alter said interrogation signals to indicate the altitude of said station.

3. In a system according to claim 2, wherein a plurality of stations are each provided with equipment similar to said equipment on said station wherein said equipment further comprises an indicator for producing a display, a first indicator sweep circuit producing a sweep indicative of distance synchronized with said interrogation signals, a second indicator sweep circuit for producing a sweep indicative of the rotary position of said rotatable directive pattern, means for selectively receiving interrogation signals from others of said plurality of stations, and means for applying said selected signals to said indicator, whereby a display of said other stations is produced on said indicator.

4. In a system according to claim 3, the further equipment wherein said means for selectively receiving said interrogation signals comprise means selective in accordance with the altitude indicating signals.

5. In a system according to claim 1 equipment at said beacon stations comprising a cathode ray indicator, a first sweep circuit means for producing distance indicating sweeps of the cathode ray beam of said indicator, a second sweep circuit for producing an angular sweep of said beam, means for producing coded impulses synchronized with said reference signal, means for coding said coded impulses in accordance with successive distance indications, means for controlling said responder beacon to transmit signals corresponding to the distance indication of said interrogation signals, means to control the distance indicating sweep of said cathode ray indicator to correspond with the distance of said interrogation signals, and means to apply said interrogation signals to said indicator whereby stations within the range of said distance sweep will be indicated.

6. In a system according to claim 5 further equipment comprising means responsive to successive rotations of said directive pattern for producing successive distance indicative coding of said coded impulses.

7. In a system according to claim 6 further equipment comprising means for causing said means responsive to successive-rotations to speed up said successive distance indicative coding.

8. In a system according to claim 5, equipment further comprising altitude selective means for selectively applying signals altered in accordance with a predetermined altitude range to said indicator.

9. A radio navigation system comprising a beacon station transmitting a rotatable directive radiation pattern producing the effect of a modulating wave pattern at a receiver and a reference wave pattern of a frequency related to said modulating wave pattern, a station carrying a receiver adapted to receive said radiation pattern and said reference wave pattern whereby a direction line from the station to the beacon can be established, means at said station for transmitting interrogation signals to said beacon, a responder at said beacon for transmitting pulses in response to said interrogation signals from said station whereby the distance of said station from the beacon can be determined at said station by comparison of the timing of the transmitted pulses and the interrogation signals from said station, means at said beacon for transmitting signals characterized for discrete distances from said beacon, each said discrete distance increasing with each said rotation of said radiation pattern until a desired maximum is reached, means at said receiver for detecting said characterized signals and comparing said characterized signals with the ascertained distance of said station from said beacon and means on said receiver responsive to coincidence of said characterized signals and said ascertained distance and at the time of a predetermined phase relation of said modulation wave pattern and said reference signal wave to transmit further signals containing said distance indication and means to permit all stations responding to the same distance signal to reply in turn to the beacon interrogation.

10. A radio navigation system according to claim 9 wherein said beacon comprises means to transmit answering signals in response to said further signals.

11. A radio navigation system comprising a beacon station transmitting a rotatable directive radiation pattern producing the effect of a modulating wave pattern at a receiver and a reference wave pattern of a frequency related to said modulating wave pattern, a plurality of aircraft each carrying a receiver adapted to receive said radiation pattern and said reference wave pattern whereby the bearing of each said aircraft relative to said beacon can be determined, means at each said receiver for transmitting characteristic interrogation signals to said beacon, a responder at said beacon for transmitting pulses in response to said interrogation signals whereby the distance of each said aircraft from said beacon can be determined by a comparison of the timing of the transmitted pulses and the interrogation signals from said aircraft, means at said beacon for transmitting signals coded for discrete ranges from said beacon, each said discrete range increasing with each said rotation of said radiation pattern until a desired maximum is reached, means at each said aircraft for detecting said beacon coded signals and comparing said beacon coded signals with the ascertained distance of said aircraft from said beacon and means responsive to said comparison to establish in cooperation with means at said beacon a time period for exchange of information between each said aircraft and said beacon and means to permit all aircraft responding to the same range signal to reply in turn to the beacon interrogation.

12. A radio navigation system according to claim 11 wherein said means at said beacon to establish a time period for exchange of information between each said aircraft and said beacon includes means whereby the increase of said discrete distance with each said rotation of said radiation pattern is stopped for at least two of said rotations.

References Cited by the Examiner
UNITED STATES PATENTS

| | | | |
|---|---|---|---|
| 2,666,198 | 1/54 | Wallace | 343—11 |
| 2,890,449 | 6/59 | Pickles et al. | 343—6.5 |
| 3,055,001 | 9/62 | Ricketts | 343—106 |

CHESTER L. JUSTUS, *Primary Examiner.*

KATHLEEN CLAFFY, *Examiner.*